(12) United States Patent
Girondi

(10) Patent No.: US 11,965,441 B2
(45) Date of Patent: Apr. 23, 2024

(54) BLOW-BY GAS FILTRATION ASSEMBLY WITH ANNULAR ALIGNMENT AND FIXING GROUP

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 0 days.

(21) Appl. No.: 18/251,504

(22) PCT Filed: Oct. 29, 2021

(86) PCT No.: PCT/IB2021/060028
§ 371 (c)(1),
(2) Date: May 2, 2023

(87) PCT Pub. No.: WO2022/097000
PCT Pub. Date: May 12, 2022

(65) Prior Publication Data
US 2024/0026806 A1 Jan. 25, 2024

(30) Foreign Application Priority Data
Nov. 3, 2020 (IT) .......................... 102020000026194

(51) Int. Cl.
*F01M 13/04* (2006.01)
(52) U.S. Cl.
CPC ..... *F01M 13/04* (2013.01); *F01M 2013/0422* (2013.01); *F01M 2013/0438* (2013.01)
(58) Field of Classification Search
CPC ... F01M 2013/0438; F01M 2013/0422; F01M 13/04
See application file for complete search history.

(56) References Cited

U.S. PATENT DOCUMENTS

| 4,981,502 A * | 1/1991 | Gottschalk | B01D 45/14 55/438 |
| 5,494,020 A * | 2/1996 | Meng | F01M 13/04 55/DIG. 19 |
| 2018/0104633 A1* | 4/2018 | Bonne | F01M 13/04 |

FOREIGN PATENT DOCUMENTS

| CN | 211397685 U | 9/2020 |
| IT | 201800011121 A1 | 6/2020 |

(Continued)

OTHER PUBLICATIONS

Italian Search Report received for Italian Serial No. 2020 000026194 dated Jun. 4, 2021, 2 pgs.

(Continued)

*Primary Examiner* — Kevin A Lathers
(74) *Attorney, Agent, or Firm* — Merchant & Gould P.C.

(57) ABSTRACT

A blow-by gas filtration assembly fluidically connects to an internal combustion engine crankcase venting circuit. The filtration assembly has an axis and a main body including a filtration chamber with a flow aperture delimited by an aperture edge concentric to the axis. The filtering assembly includes a filter group; including a filter cavity crossed by blow-by gases; a command group connected to the filter group; an annular collar connected to the filter group; an annular alignment and fixing group between the aperture edge and the annular collar, for coupling the filter group to the main body. A dynamic element includes a first radial face engaged at the aperture edge and a second radial face radially facing the annular collar; an annular element between the dynamic element and the annular collar. The annular element elastically yields to a flattened configuration compressed between the second radial face and the annular collar.

18 Claims, 3 Drawing Sheets

(56) References Cited

FOREIGN PATENT DOCUMENTS

WO    2020121249  A1    6/2020
WO    2020128739  A1    6/2020

OTHER PUBLICATIONS

International Search Report and Written Opinion received for PCT Serial No. PCT/IB2021/060028 dated Jan. 21, 2022, 11 pgs.
International Preliminary Report on Patentability received for PCT Serial No. PCT/IB2021/060028 dated Jun. 20, 2022, 5 pgs.

* cited by examiner

BLOW-BY GAS FILTRATION ASSEMBLY WITH ANNULAR ALIGNMENT AND FIXING GROUP

CROSS-REFERENCE TO RELATED APPLICATIONS

This application is a National Stage Application of PCT/IB2021/060028, filed Oct. 29, 2021, which claims benefit of Ser. No. 10 2020 000026194, filed Nov. 3, 2022, in Italy and which applications are incorporated herein by reference. To the extent appropriate, a claim of priority is made to each of the above disclosed applications.

FIELD OF APPLICATION

The present invention relates to a blow-by gas filtration assembly.

In particular, the blow-by gas filtration assembly of the present invention is fluidically connectable to the engine system of a vehicle to receive the blow-by gases and filter the suspended particles therefrom.

Specifically, "blow-by gas" means the oil vapors vented from the crankcase of an internal combustion engine during its operation. In particular, said blow-by gases have a composition similar to that of the exhaust gases and are generated by the combustion of the air/fuel mixture in the combustion chamber. Instead of reaching the exhaust emission circuit, these gases leak into the lower portion of the crankcase, passing by the side of the cylinders and carrying carbon particles and oil droplets with them. In the present discussion, for the sake of simplicity, the blow-by gases are considered to be constituted by air and suspended particles; said suspended particles include oil droplets and/or carbonaceous particulates.

BACKGROUND ART

In the prior art, filtering assembly solutions connectable to the crankcase and suitable for venting the blow-by gases therefrom are known.

Specifically, solutions of blow-by gas filtration assemblies are known, which are suitable for separating said undesired suspended particles from the blow-by gas comprising a filter group having said purpose.

In the background art, a plurality of embodiments of filtration assemblies is known. For example, a first type provides the presence of a filter group comprising a porous type filtering means suitable for filtering the blow-by gases when they pass through; a second type provides the presence of a filter group comprising a plurality of discs reciprocally spaced apart and guided in rotation, in which the suspended particles are separated from the air by the action of centrifugal force; a third type provides the combination of the first two types, in which porous type filtering means which are guided in rotation are provided.

In this context, with particular reference to the aforementioned third preferred embodiment, the known solutions are particularly complex and of complex assembly (and disassembly) with particular reference to the positioning of the filter group inside the main body of the blow-by gas filtration assembly and with particular reference to the positioning of the filter group relative to the command group and in particular to their mutual positioning, which must be guaranteed perfectly in axis to take place in a correct manner which is long-lasting over time.

Solution of the Invention

In this context, the need is strongly felt for a blow-by gas filtration assembly which solves the aforesaid problem, presenting itself in a simple form and providing that the filter group easily assemblable (and disassemble) and is in a predetermined axial position guaranteed over time.

It is the object of the present invention to provide a new, improved embodiment of a blow-by gas filtration assembly to respond to the aforesaid requirement.

Such an object is achieved by the blow-by gas filtering assembly.

DESCRIPTION OF THE DRAWINGS

Further features and advantages of the invention will become apparent from the description provided below of preferred exemplary embodiments thereof, given by way of non-limiting example, with reference to the accompanying drawings, in which.

DETAILED DESCRIPTION

Figure 1:
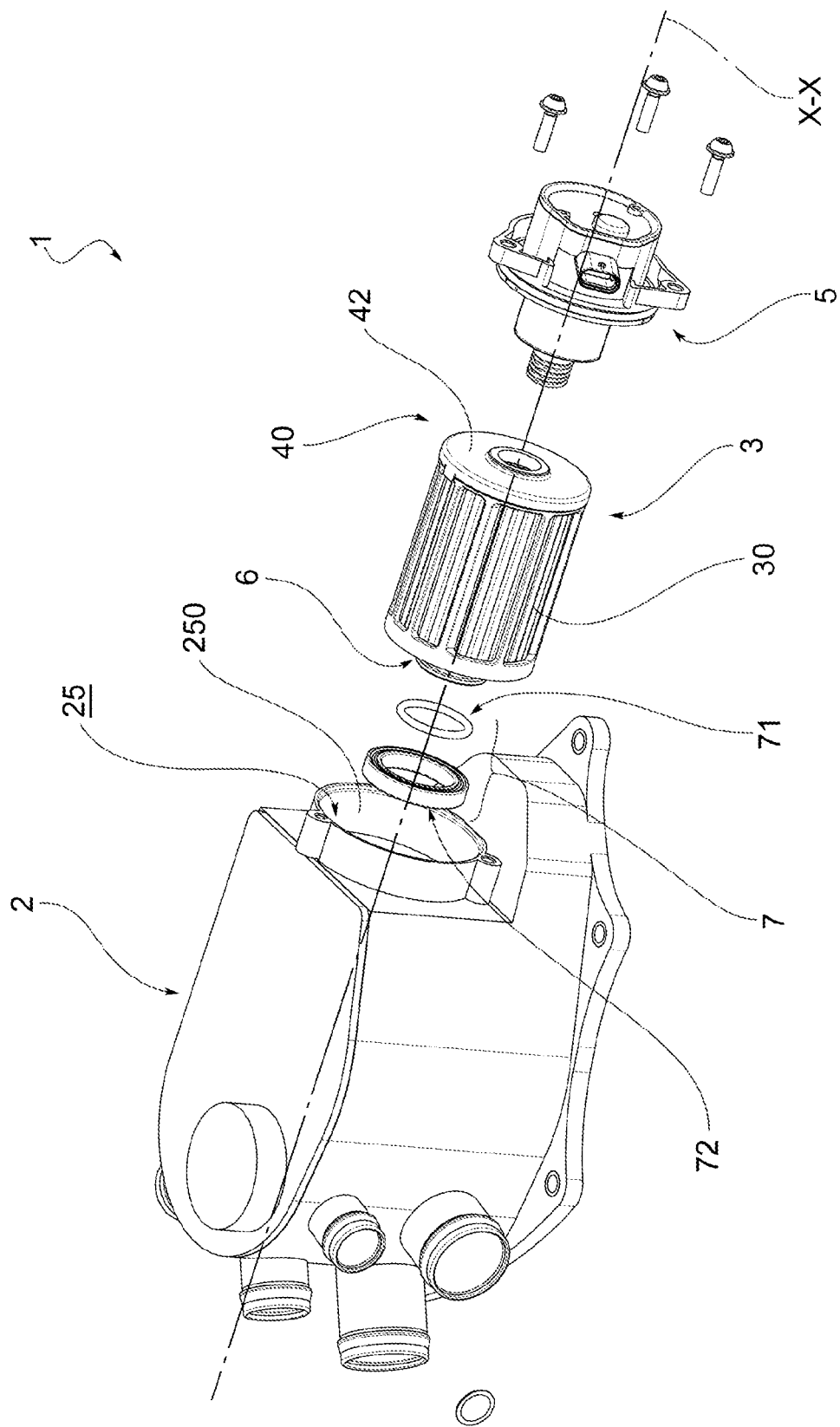
FIG. 1 shows a perspective view with parts separated of the blow-by gas filtrating assembly of the present invention according to a preferred embodiment.
Figure 2:
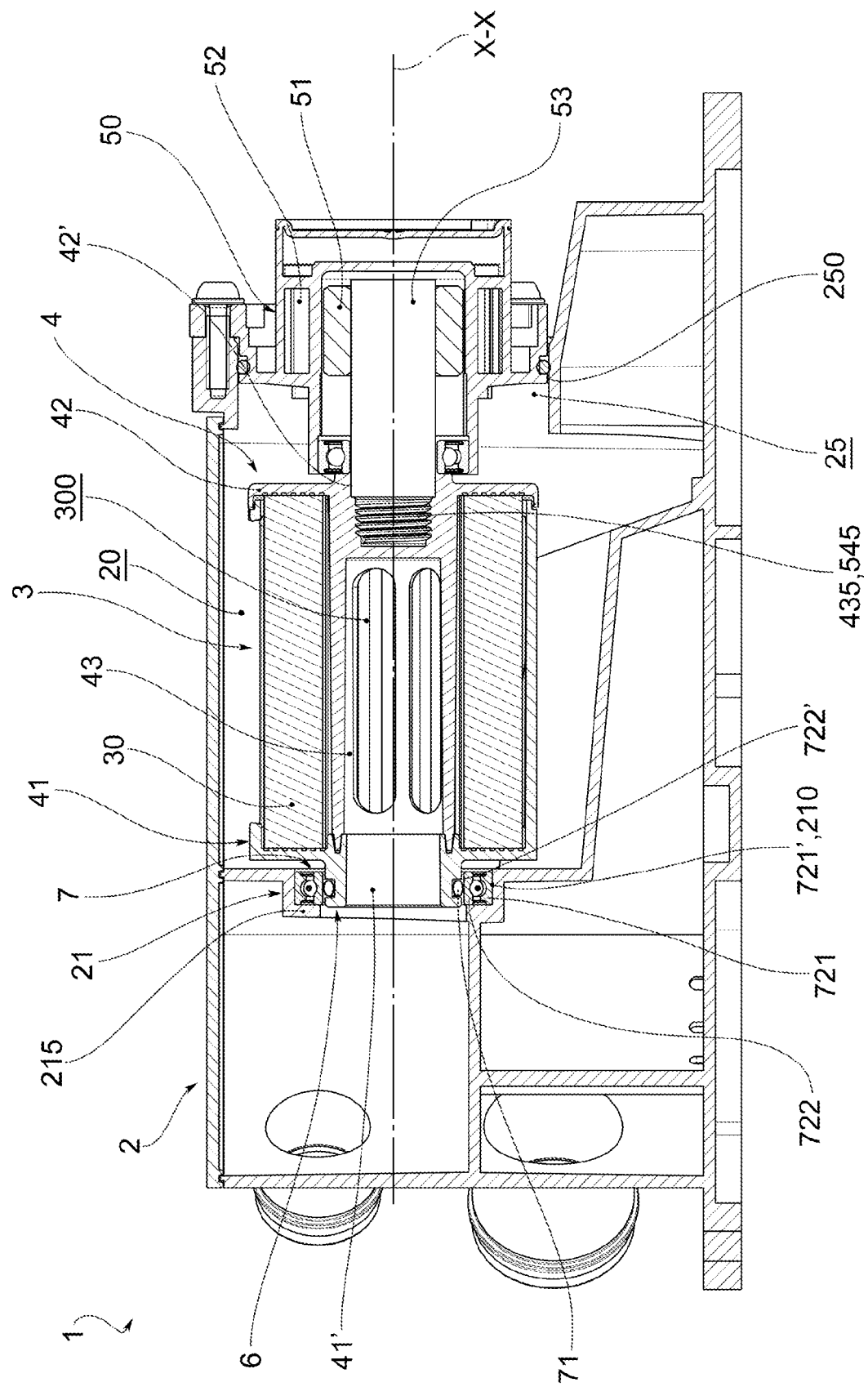
FIG. 2 shows a longitudinal section view of the blow-by gas filtering assembly in FIG. 1.
Figure 3:
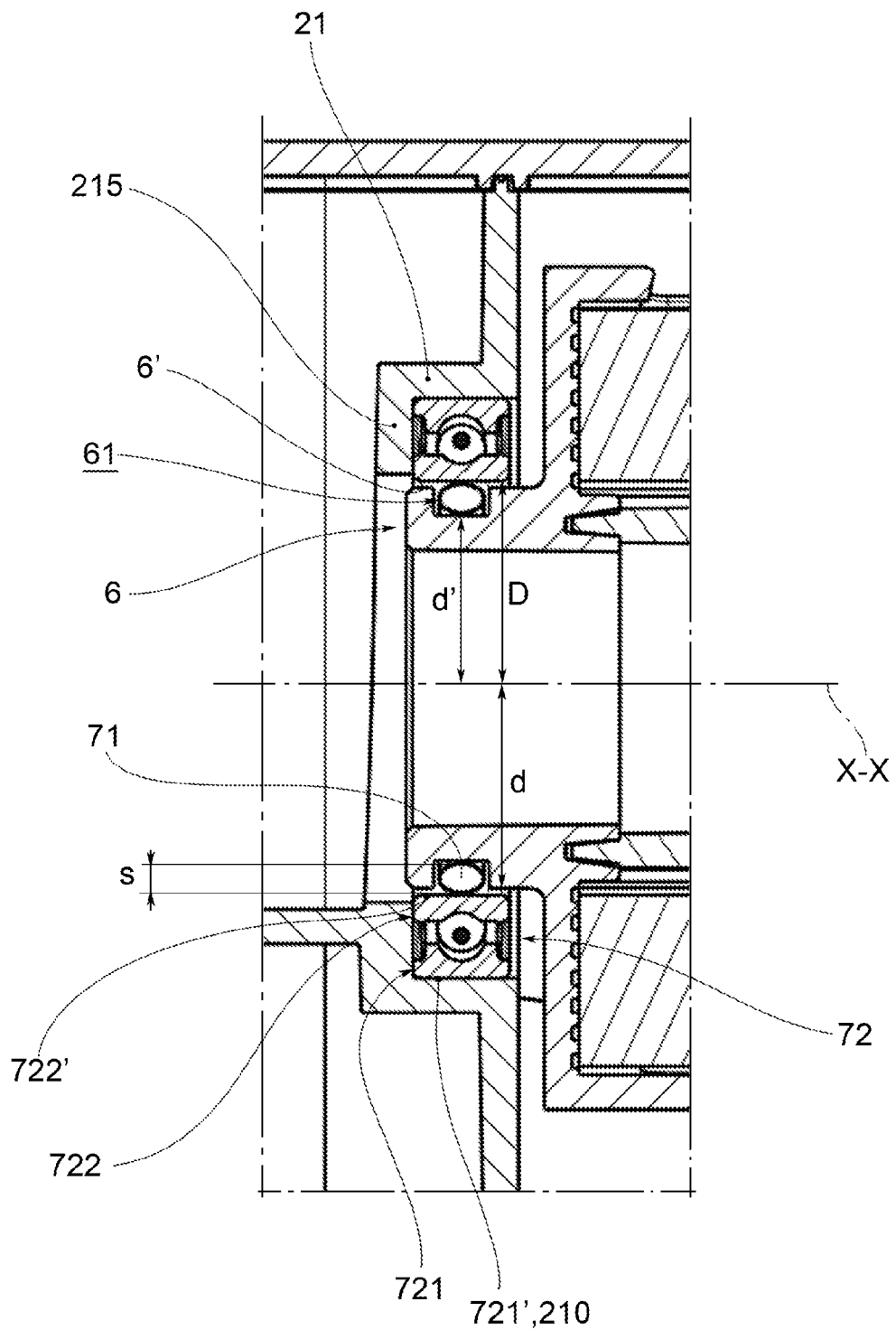
FIG. 3 shows an enlarged view of a portion of the blow-by gas filtration assembly in FIG. 2.

With reference to the accompanying figures, reference numeral 1 indicates as a whole a blow-by gas filtering assembly suitable for performing the filtering/separating action on the particles (liquid and/or solid) suspended in the gas current.

Said blow-by gas filtration assembly 1 is fluidically connectable to a crankcase venting circuit of an internal combustion engine to receive blow-by gases and filter them from the suspended particles contained therein and return the clean (i.e., filtered) gas stream to other systems of the vehicle, e.g. such as to the engine air intake circuit communicating with the combustion chamber of the endothermic engine.

Preferably, said blow-by gas filtration assembly 1 is directly mountable onto the crankcase of an internal combustion engine of a vehicle. In particular, the present invention is not limited to this feature; the blow-by gas filtration assembly 1 could, for example, be configured as a stand-alone device comprising respective inlet and outlet ports communicating respectively with the engine crankcase, to receive the blow-by gases to be filtered, and with the air intake circuit, to recirculate the gas stream filtered from solid and liquid particles towards the combustion chamber.

According to the present invention, the filtration assembly 1 comprises an axis X-X relative to which the components described below are developed or positioned.

According to the present invention, the blow-by gas filtration assembly 1 comprises a main body 2. Preferably, the other components of the system are positioned in said main body 2 or on said main body 2, as hereinafter fully described and apparent from the accompanying exemplifying figures.

In particular, the main body 2 comprises a filtration chamber 20 in which blow-by gas filtration/separation operations take place. The filtration chamber 20 is thus fluidically connected to the crankcase venting circuit of an internal combustion engine of a vehicle to receive the fouled blow-by gases, i.e. comprising suspended particles (solid and/or liquid), and feed clean the blow-by gases, i.e. cleaned of suspended particles, back into the engine air intake system.

According to a preferred embodiment, the main body 2 comprises respective inlets and outlets for the blow-by gases hereinafter described in detail.

Furthermore, according to a preferred embodiment, the main body 2 comprises an insertion aperture 25 through which the components described are insertable into the main body 2, preferably into the filtration chamber 2.

Preferably, the insertion aperture 25 is obtained along the axis X-X having extension (orientation) orthogonal to said axis X-X. Preferably, the insertion aperture 25 is defined laterally and annularly by an insertion aperture edge 250.

According to the present invention, the blow-by gas filtration assembly 1 comprises a filter group 3, accommodating and operating in said filtration chamber specifically suitable for performing said filtration/separation operations of particles suspended in blow-by gases.

The filter group 3 extends along the axis X-X having a hollow cylindrical shape, comprising, indeed, a filter cavity 300.

Preferably, the filter group 3 is crossable in radial filtration.

According to a preferred embodiment, the filter group 3 is crossable by blow-by gases from the outside to the inside and thus the filter cavity 300 is fluidically connected with an outlet aperture, while a gas inlet aperture is positioned externally to the filter group 3, to feed the gases to be filtered towards the external radial surface of the filter group 3.

According to a variant embodiment, the filter group 3 is crossable by blow-by gases from the inside to the outside and thus the filter cavity 300 is fluidically connected with an inlet aperture, while a gas outlet aperture is positioned externally to the filter group 3, to allow the filtered gases coming from the filter group 3 to flow out.

According to the invention, the filter group 3 comprises a filter media 30.

The filter media 30, crossable radially, comprises a nonwoven fabric pleated in a star shape or a cylindrically shaped porous septum.

According to a preferred embodiment, the blow-by gas filtration assembly 1 comprises a support structure 4 supporting the filter group 3, and in particular, the filter media 30.

According to a preferred embodiment, the support structure 4 comprises a first plate 41 at an axial end of the filter media 30.

Preferably, the support structure 4, comprises a second plate 42 at the other axial end.

Further, according to a preferred embodiment, the support structure 4 comprises a central frame 43 which accommodates within the filter media 30 and joining the first plate 41 and the second plate 42 to operatively connect them integrally in rotation. Preferably, said central frame 43 has a plurality of through apertures suitable for allowing the passage of fluid.

As shown by way of example, in the accompanying figures, the filter cavity 300 extends between the filter plates 41, 42 surrounded by the filter media 30.

According to a preferred embodiment, the first plate 41 has a first passage 41'.

According to a preferred embodiment, the second plate 42 has a second step 42'.

Preferably, said passages 41', 42' are concentric to the axis X-X, such as the filter cavity 300.

Furthermore, according to the present invention, the filtration assembly 1 comprises a command group 5 supported on the main body 2 operationally connected to the filtering group 3 to command it in rotation about the X-X axis.

Furthermore, according to a preferred embodiment, the filtration assembly comprises a command group 5 partially accommodated and supported on the main body 2 operationally connected to the filtering group 3 to command it in rotation about the axis X-X.

According to a preferred embodiment, the command group 5 is mountable onto the main body 2 sealing said insertion aperture 25. Preferably, as shown in the accompanying figures, the command group 5 seals the insertion aperture edge 250 in the radial direction closing the insertion aperture 25.

According to a preferred embodiment, the command group 5 is of the electric type.

According to a preferred embodiment, the command group 5 is an electric motor of the brushless type.

According to a preferred embodiment, the command group has an electrical connector for electrically connecting the filtration assembly 1 to the vehicle ECU to command its operation.

According to a preferred embodiment, the electric motor 50 comprises a rotor 51 and a stator 52, wherein the rotor 51 is integrally connected with the filter group to command it in rotation.

According to a preferred embodiment, such as that shown in the accompanying figures, the electric motor 50 comprises a control shaft 53 moved in rotation by the action of the rotor 51. Preferably, said control shaft 53 is operatively connected to the filter group 3 to drive it in rotation.

According to a preferred embodiment, the control shaft 53 and the filter group 3 are integrally engaged with each other.

According to a preferred embodiment, the control shaft 53 and the filter group 3 are mutually engaged by means of a rigid type coupling.

According to a preferred embodiment, the control shaft 53 and the filter group 3 are mutually engaged by means of a threaded coupling.

According to a preferred embodiment, such as that shown by way of example in the accompanying figures, the filter group 3 on the second plate 42 and/or the central frame 43 comprises a screw or nut 435, and the control shaft 53 comprises a mother screw or screw 535 engageable to the filter group 3.

In other words, according to a preferred embodiment, the second step 42' comprises said mother screw 535.

Preferably, said threaded coupling is performed in a rotational direction opposite to that according to which the filter group 3 is driven in rotation.

According to further embodiments, the central frame 43 extends lengthwise along the axis X-X beyond the second plate 42 and is directly engaged by the rotor 51. According to such an embodiment, the central frame 43 results in a single shaft on which the filter media 30 and the rotor 51 are mounted.

According to other further embodiments, however, the electric motor 50 has a control shaft 53 extending, from the rotor 41, lengthwise through the filter cavity 300, through the central frame 43. In other words, the control shaft 53 extends lengthwise through the second plate 42 and through the first plate 41.

Turning back to the main body 2 comprised in the blow-by gas filtration assembly 1, it is specified how this comprises a flow aperture 21 delimited by an aperture edge 210.

Preferably, the flow aperture 21 is thus substantially orthogonal to the axis X-X.

Therefore, the flow aperture 21 preferably extends parallel to the insertion aperture 25.

According to the present invention, the aperture edge 210 extends concentrically relative to the axis X-X.

According to a preferred embodiment, the support structure 4 fluidically connects the filter cavity 300 with said flow aperture 21.

According to a preferred embodiment, the control shaft 53 extends along the filter group 3 and along the support structure 4 and fluidically connects the filter cavity 300 to said flow aperture 21.

According to the present invention, the blow-by gas filtration assembly 1 comprises an annular collar 6 operatively connected to the filter group 3.

According to a preferred embodiment, the annular collar 6 extends substantially concentrically relative to the axis X-X.

Preferably, said annular collar 6 also extends axially parallel to the axis X-X identifying an annular collar wall 6'.

According to a preferred embodiment, the annular collar 6 is positioned radially facing the aperture edge 210.

According to a preferred embodiment, the annular collar 6 is comprised within the support structure 4. According to a preferred embodiment, said annular collar 6 is comprised in the first plate 41. According to another preferred embodiment, said annular collar 6 is comprised in the central frame 43.

According to a preferred embodiment, with the control shaft 53, which extends in length beyond first plate 41, the annular collar 6 is comprised in said control shaft 53.

According to a preferred embodiment, the annular collar 6 is radially facing the aperture edge 210 so that the annular collar 6 is radially more proximal to the axis X-X than the aperture edge 210.

According to a preferred embodiment, the annular collar 6 is radially facing the aperture edge 210 so that the annular collar 6 is radially more distal from the axis X-X than the aperture edge 210.

According to the present invention, the blow-by gas filtration assembly 1 comprises an annular alignment and fixing group 7, positioned between the aperture edge 210 and the annular collar 6, suitable for performing the rotational and fluidic mechanical coupling of the filter group 3 with the main body 2.

According to a preferred embodiment, the filter group 3 on one side is engaged to the command group 5 which in turn is engaged to the main body 2, while at the other side, it is engaged to the main body 2 via the annular alignment and fixing group 7.

Said annular alignment and fixing group 7 comprises a dynamic element 72 comprising a first radial face 721' engaged at the aperture edge 210 and a second radial face 722' radially facing the annular collar 6.

In other words, the dynamic element 72 is connected to the edge aperture 210.

Preferably, the dynamic element 72 comprises a first bearing ring 721 comprising the first radial face 721' and comprises a second bearing ring 722' comprising the second radial face 722', wherein the two bearing rings are operationally connected to each other and rotationally free.

According to a preferred embodiment, the dynamic element 72 is a rolling bearing.

According to a preferred embodiment, the dynamic element 72 is a sliding bearing.

Preferably, the aperture edge 210 comprises a step 215 on which the dynamic element 72 rests axially.

According to the accompanying figures, it is worth noting that the first bearing ring 721 and the first radial face 721' are radially external, while the second bearing ring 722 and the second radial face 722' are radially internal.

According to other preferred embodiments, the first bearing ring 721 and the first radial face 721' are radially internal, while the second bearing ring 722 and the second radial face 722' are radially external.

According to the present invention, the annular alignment and fixing group 7 further comprises an elastically yielding annular element 71 positioned between dynamic element 72 and annular collar 6.

In other words, said elastically yielding annular element 71 is suitable for mutually connecting and locking the dynamic element 72, in particular the second radial face 722' to the annular collar 6.

According to the present invention, the elastically yielding annular element 71 is elastically yielding by displaying a flattened configuration in which it is volumetrically compressed between the second radial face 722' and the annular collar 6.

In particular, said volumetric compression is such that it integrally mutually engages the dynamic element 72 and the annular collar 6 to rotate therewith.

In other words, by means of the elastically yielding annular element 71, the annular collar 6 rotates in unison with the second radial face 722', preferably with the second bearing ring 722.

According to a preferred embodiment, the elastically yielding annular element 71 guarantees the mutual engagement between the second radial face 722' and the annular collar 6 undergoing an average volume compression Cx equal to or lower than 70%, preferably equal to or lower than 40%, of its volume in a resting configuration. In other words, average volumetric compression Cx means the average value between Cmax and Cmin observed in the volume of the alignment and fixation annular element 71 in a compressed configuration.

According to a preferred embodiment, the elastically yielding annular element undergoes a compression distributed in its volume to occupy the space present between the annular collar 6 and the second radial face 722' supporting the filter group 3 and/or the control shaft 53 and rotatably coupling the annular collar 6 and the dynamic element 72.

If the annular collar 6 and the second radial face 722' are perfectly concentric, the annular elastically yielding element 71 has constant volumetric compression (i.e., the Cmax value is equal to the Cmin value) over its entire volume.

Otherwise, if there is a misalignment between annular collar 6 and second radial face 722', the elastically yielding annular element 71 has some annular portions more compressed than others.

According to a preferred embodiment, the annular collar 6 comprises a housing slot 61 in which the elastically yielding annular element 71 is partially accommodated.

According to a preferred embodiment, said housing slot 6 is formed on the annular collar wall 6'.

Preferably, the dimensions of the housing slot 61 are such that the elastically yielding annular element 71 in the crushed configuration engages and discharges its thrust action on one or more walls of the housing slot 61, preferably on all walls of the housing slot 61.

According to a preferred embodiment, the annular collar 6 is distant from the axis X-X by an annular collar distance "d".

Preferably, the second radial face 722' is distant from the axis X-X by a face distance "D".

According to a preferred embodiment, the elastically yielding annular element 71 in a resting configuration has a thickness "s".

Preferably, the housing slot 61 is distant from the axis X-X by a slot distance "d'". Preferably, the distance "d'" is measured by taking the distance between the axis X-X and the radial wall of the housing slot 61 oriented substantially parallel to the axis X-X.

According to a preferred embodiment, in which the annular alignment and fixing group 7 is radially external to the annular collar 6, the face distance D is greater than the annular collar distance d.

Preferably, in such an embodiment, the sum of the thickness s with the annular collar distance d is greater than the face distance D.

Preferably, in such an embodiment, in which the housing slot 61 is also provided, the sum of the annular distance of the thickness s with the slot distance d' is greater than the face distance D.

Conversely, according to a preferred embodiment, in which the annular alignment and fixing group 7 is radially internal relative to the annular collar 6, the annular collar distance d is greater than the face distance D.

Preferably, in such an embodiment, the sum of the thickness s with the face distance D is greater than the annular collar distance d.

Preferably, in such an embodiment, in which the housing slot 61 is also provided, the sum of the thickness s with the face distance D is greater than the slot distance d'.

According to a preferred embodiment, the elastically yielding annular element 71 is made of an elastomeric material.

According to a preferred embodiment, the elastically yielding annular element 71 is made of a material having a hardness of between 20 and 80 shore A.

According to a preferred embodiment, the elastically yielding annular element 71 is an O-ring.

According to the preferred embodiment, the filter group 3 is radially crossed by blow-by gases from the outside to the inside and thus the flow aperture 21 corresponds to the aperture from which the filtered gases flow.

Preferably, the main body 2 comprises an inlet port radially facing the filter group 3.

Innovatively, the blow-by gas filtration assembly of the present invention largely fulfills the object of the present invention by having a simple shape in which the axial position of the filter group is guaranteed.

Advantageously, the blow-by gas filtration assembly provides that the filter group interacts with specific specially prepared components so that it is in a given axial position. Advantageously, the annular alignment and fixing group is suitable for recovering any misalignments relative to the axis of the filter group. Advantageously, the annular alignment and fixing group is suitable for recovering any misalignment due to the main body and the positioning of the command group.

Advantageously, the annular alignment and fixing group is suitable for recovering any misalignments present between the rotation axis of the dynamic element, coupled to the main body, and the rotation axis of the filter group coupled to the command group.

Advantageously, the annular alignment and fixing group is suitable for discharging and undergoing the action of possible vibratory actions avoiding them from reaching the filter group.

Advantageously, the annular alignment and fixing group is suitable dampening any vibrations while preventing them from reaching the electric motor, increasing the reliability of the filtration assembly. Advantageously, the filter group is easy to assemble/disassemble on the annular alignment and fixing group.

Advantageously, the annular alignment and fixing group makes it possible to guarantee the rotational coupling between the dynamic element and the annular collar (and indirectly of the filter group) solving possible problems associated with the creation of a precise geometrical coupling between the annular collar and the dynamic element, which is in turn positioned on the main body.

Advantageously, the annular alignment and fixing group makes it possible to reduce the manufacturing cost of the filtration assembly avoiding the adoption of complex manufacturing processes for the production of the main body, annular collar, dynamic element and alignment element.

Advantageously, the annular alignment and fixing group and filter group are insertable into the main body through the same insertion aperture, which is closed by the command group. Advantageously, the need to have any closure covers provided specifically to allow the extraction and/or insertion of components into the filtration chamber is avoided, simplifying the structure of the filtration assembly.

Advantageously, the annular alignment and fixing group, the filter group and the command group are insertable into the main body as a pre-assembled module, facilitating the assembly of the filtration assembly. Advantageously, the annular alignment and fixing assembly is a multifunctional element which simultaneously fulfills the functions of mechanical coupling (rotation), compensation and fluidic coupling and/or sealing.

Advantageously, the annular alignment and fixing group comprises an elastically yielding element which hermetically couples the filter group to the main body, contributing to define fluid passages within the main body by avoiding the problem of potential blow-by gas leakage.

Advantageously, the elastically yielding annular element is made of an elastomeric material capable of assuming a compressed configuration useful to compensate for backlash and at the same time generate the friction necessary to ensure the correct transfer of the rotary action applied by the command group to the filter group.

Advantageously, the alignment and fixing element is made from a simple component reducing the costs associated with manufacturing the filtration assembly.

Advantageously, the filter group requires a minimum number of sealing elements, e.g. one gasket is sufficient, possibly two gaskets.

It is apparent that a person skilled in the art may make changes to the blow-by filtering assembly described above, all of which are contained within the scope of protection as defined in the following claims to meet contingent needs.

REFERENCE NUMBER LIST

1 blow-by gas filtration assembly
2 main body
20 filtration chamber
21 flow aperture
210 aperture edge
215 step
25 insertion aperture
250 insertion aperture edge
3 filter group
30 filter media 300 filter cavity
4 support structure
41 filter first plate
41' first passage
42 filter second plate
42' second passage
43 central frame
435 mother screw
5 command group
50 electric motor
51 rotor
52 stator
53 control shaft
545 screw
6 annular collar
6' annular collar wall
61 housing slot
7 annular alignment and fixing group
71 elastically yielding annular element
72 dynamic element
721 first bearing ring
721' first radial face
722 second bearing ring
722' second radial face
X-X axis
d annular collar distance
d' slot distance
D face distance
S thickness

The invention claimed is:

1. A blow-by gas filtration assembly fluidically connectable to a crankcase ventilation circuit of an internal combustion engine to receive blow-by gases and filter the blow-by gases from suspended particles contained therein, wherein the filtration assembly has an axis and comprises:
   a main body comprising a filtration chamber which extends along said axis (X-X) comprising a flow aperture delimited by an aperture edge which extends concentrically relative to the axis;
   a filter group which comprises a filtering media, cylindrical hollow, comprising a filter cavity, radially crossable in filtration by the blow-by gases;
   a command group supported on the main body operationally connected to the filter group to command the filter group in rotation about the axis;
   an annular collar operationally connected to the filter group;
   an annular alignment and fixing group, positioned between the aperture edge and the annular collar, adapted to perform rotational and fluidic mechanical coupling of the filter group with the main body, comprising:
      i) a dynamic element comprising a first radial face engaged at the aperture edge and a second radial face radially facing the annular collar;
      ii) an elastically yielding annular element positioned between dynamic element and annular collar, wherein the elastically yielding annular element is elastically yielding in a flattened configuration in which the elastically yielding annular element is volumetrically compressed between the second radial face and the annular collar to integrally engage the dynamic element and the annular collar to rotate therewith.

2. A blow-by gas filtration assembly according to claim 1, wherein the dynamic element comprises a first bearing ring comprising the first radial face and comprises a second bearing ring comprising the second radial face, wherein the two bearing rings are operationally connected to each other and rotationally free.

3. A blow-by gas filtration assembly according to claim 2, wherein the dynamic element is a rolling bearing or sliding bearing.

4. A blow-by gas filtration assembly according to claim 1, wherein the elastically yielding annular element guarantees mutual engagement between the second radial face and the annular collar undergoing an average volume compression equal to or lower than 70% of a volume of the elastically yielding element in a resting configuration.

5. A blow-by gas filtration assembly according to claim 1, wherein the annular collar comprises a housing slot in which the elastically yielding annular element is partially accommodated.

6. A blow-by gas filtration assembly according to claim 1, wherein the annular alignment and fixing group is radially external relative to the annular collar, wherein the annular collar comprises an annular collar wall which is distanced from the axis by an annular face distance, while the second radial face is distanced from the axis by a face distance, wherein the face distance is greater than the annular collar distance.

7. A blow-by gas filtration assembly according to claim 1, wherein the annular alignment and fixing group is radially internal relative to the annular collar, wherein the annular collar comprises an annular collar wall which is distanced from the axis by an annular face distance, while the second radial face is distanced from the axis by a face distance, wherein the annular collar distance is greater than the face distance.

8. A blow-by gas filtration assembly according to claim 7, wherein the elastically yielding annular element in a resting configuration has a thickness (s) and wherein:
   with annular alignment and the fixing group radially external relative to the annular collar, a sum of an annular distance of thickness (s) with the annular collar distance is greater than the face distance; or
   with annular alignment and the fixing group radially internal relative to the annular collar, the sum of the annular distance of the thickness (s) with the face distance is greater than the annular collar distance.

9. A blow-by gas filtration assembly according to claim 5, wherein the housing slot is distanced from the axis by a slot distance, wherein the elastically yielding annular element in a resting configuration has a thickness (s) and wherein:
   with annular alignment and the fixing group radially external relative to the annular collar, a sum of an annular distance of thickness (s) with the slot distance is greater than the face distance; or
   with annular alignment and the fixing group radially internal relative to the annular collar, the sum of the annular distance of the thickness (s) with the face distance is greater than the grove distance.

10. A blow-by gas filtration assembly according to claim 1, wherein the elastically yielding annular element is made of elastomeric material.

11. A blow-by gas filtration assembly according to claim 1, wherein the elastically yielding annular element is made of a material having a hardness comprised between 20 and 80 Shore A.

12. A blow-by gas filtration assembly according to claim 1, further comprising a support structure of the filter media, wherein the annular collar is comprised in said supporting structure.

13. A blow-by gas filtration assembly according to claim 12, wherein the supporting structure comprises a first plate, positioned at an axial end of the filtering media, wherein said annular collar is comprised in said first plate.

14. A blow-by gas filtration assembly according to claim 1, wherein the main body comprises an insertion aperture comprising an insertion aperture edge which extends concentrically relative to the axis, wherein the command assembly engages the insertion aperture edge and seals the insertion aperture.

15. A blow-by gas filtration assembly according to claim 1, wherein the command assembly comprises an electric motor comprising a rotor and a stator, wherein the rotor is operationally connected to the filter group to command the filter group in rotation.

16. A blow-by gas filtration assembly according to claim 15, wherein the command assembly comprises a control shaft which extends in length inside the filter cavity, wherein said annular collar is comprised in said control shaft.

17. A blow-by gas filtration assembly according to claim 1, wherein the filtering media is radially crossable in filtration by the blow-by gases from the outside inwards, wherein filtered gases flow out from the flow aperture.

18. A blow-by gas filtration assembly according to claim 1, wherein the elastically yielding annular element guarantees mutual engagement between the second radial face and the annular collar undergoing an average volume compression equal to or lower than 40%, of a volume of the elastically yielding element in a resting configuration.

* * * * *